US012565801B2

(12) United States Patent     (10) Patent No.:   US 12,565,801 B2

Seubert et al.     (45) Date of Patent:    Mar. 3, 2026

---

(54) DOOR DRIVE DEVICE FOR ELECTROMOTIVELY ADJUSTING A VEHICLE DOOR

(71) Applicant: Brose Fahrzeugteile SE & Co. Kommanditgesellschaft, Bamberg, Bamberg (DE)

(72) Inventors: Matthias Seubert, Zeil (DE); Christian Wagner, Kulmbach (DE); Melanie Angermüller, Heldburg (DE); Frank Schneider, Zapfendorf (DE)

(73) Assignee: BROSE FAHRZEUGTEILE SE & CO. KOMMANDITGESELLSCHAFT, BAMBERG, Bamberg (DE)

( * ) Notice: Subject to any disclaimer, the term of this patent is extended or adjusted under 35 U.S.C. 154(b) by 0 days.

(21) Appl. No.: 18/861,535

(22) PCT Filed: Jun. 7, 2023

(86) PCT No.: PCT/EP2023/065190
§ 371 (c)(1),
(2) Date: Oct. 29, 2024

(87) PCT Pub. No.: WO2023/237586
PCT Pub. Date: Dec. 14, 2023

(65) Prior Publication Data

US 2025/0327351 A1    Oct. 23, 2025

(30) Foreign Application Priority Data

Jun. 8, 2022   (DE) ..................... 10 2022 114 432.1

(51) Int. Cl.
E05F 15/611     (2015.01)
E05F 15/603     (2015.01)
(Continued)

(52) U.S. Cl.
CPC .......... E05F 15/614 (2015.01); E05F 15/603 (2015.01); E05F 15/611 (2015.01); (Continued)

(58) Field of Classification Search
CPC ....... E05F 15/611; E05F 15/63; E05F 15/627; E05F 15/603; E05F 15/614; F16H 57/021; F16H 2057/0216; F16H 2057/02085
See application file for complete search history.

(56) References Cited

U.S. PATENT DOCUMENTS 9,109,677 B2    8/2015   Wang et al.
10,352,080 B2    7/2019   Rietdijk
(Continued)

FOREIGN PATENT DOCUMENTS

DE     102013103892 A1    10/2013
DE     102015215627 A1    2/2017
(Continued)

OTHER PUBLICATIONS

ISA European Patent Office, International Search Report Issued in Application No. PCT/EP2023/065190, Sep. 7, 2023, WIPO, 5 pages.

*Primary Examiner* — Bobby Rushing, Jr.
(74) *Attorney, Agent, or Firm* — McCoy Russell LLP

(57)       ABSTRACT

A door drive device for electromotively adjusting a vehicle door comprises an electric motor, a transmission which includes a first gear stage to be driven by the electric motor and a second gear stage operatively connected to the first gear stage, and an output element operatively connected to the second gear stage for outputting an adjusting force for adjusting the vehicle door. The first gear stage includes a first housing part. The second gear stage includes a planetary transmission to be driven by the first gear stage and a second (Continued)

housing part forming a ring gear toothing of the planetary transmission. The transmission includes an intermediate element which is arranged between the first housing part and the second housing part and connects the first housing part and the second housing part with each other in a torque-resistant manner.

20 Claims, 12 Drawing Sheets

(51) Int. Cl.
    *E05F 15/614*       (2015.01)
    *F16H 57/02*        (2012.01)
    *F16H 57/021*      (2012.01)

(52) U.S. Cl.
    CPC .............. *F16H 2057/02082* (2013.01); *F16H 2057/0216* (2013.01)

(56)              References Cited

U.S. PATENT DOCUMENTS

| | | | |
|---|---|---|---|
| 11,408,220 B2 | 8/2022 | Eguchi | |
| 11,421,465 B2 * | 8/2022 | Sproule ................. | E05F 15/632 |

FOREIGN PATENT DOCUMENTS

| | | | | |
|---|---|---|---|---|
| DE | 102017130151 A1 | | 6/2019 | |
| DE | 102018213530 A1 * | | 2/2020 | ............ E05F 15/627 |
| DE | 102019107716 A1 | | 10/2020 | |
| DE | 102019211734 A1 * | | 2/2021 | ............ F16H 3/724 |
| EP | 3527846 A1 * | | 8/2019 | ............ H02K 5/173 |
| EP | 3734008 A1 | | 11/2020 | |
| JP | 6505801 B2 * | | 4/2019 | ............ H02K 7/116 |

* cited by examiner

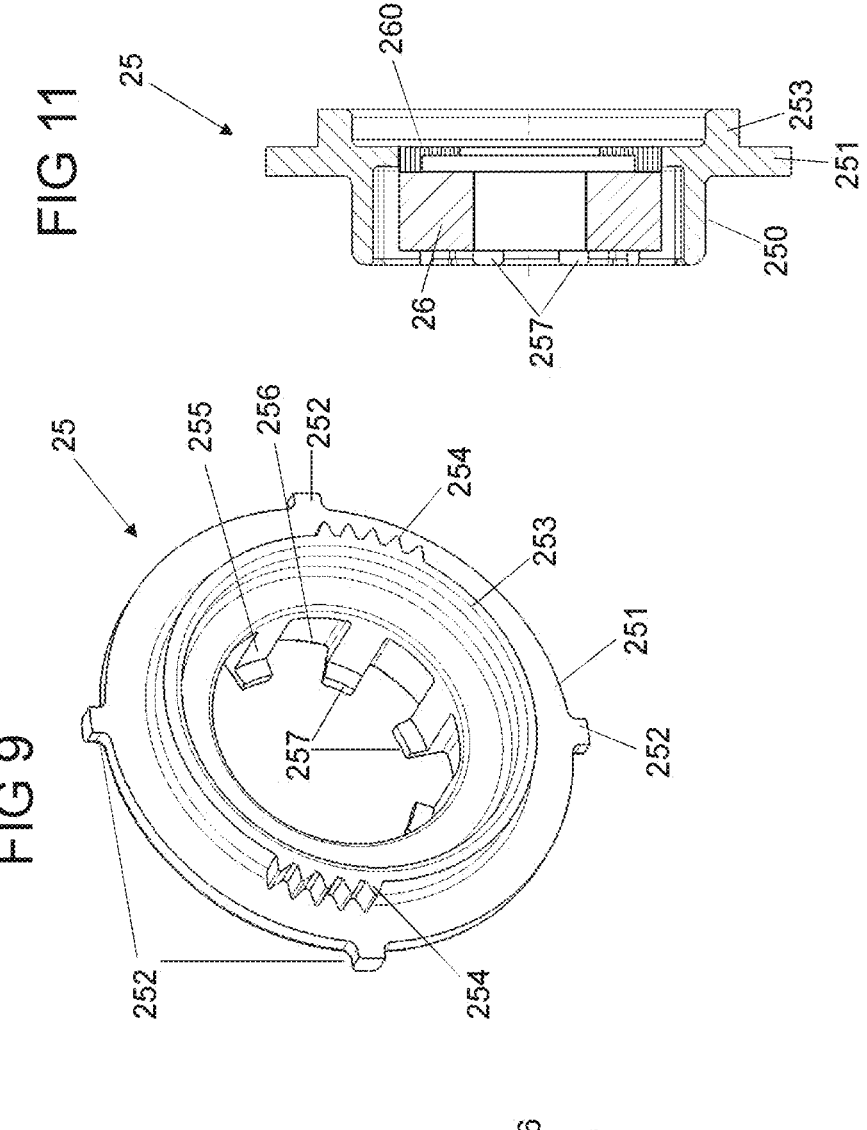
FIG 11
FIG 9
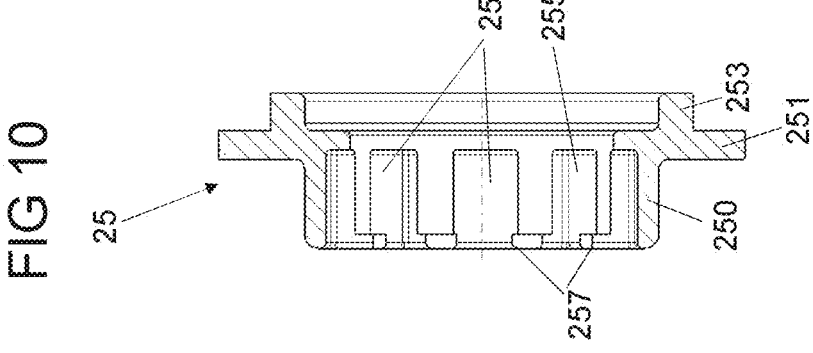
FIG 10

DOOR DRIVE DEVICE FOR ELECTROMOTIVELY ADJUSTING A VEHICLE DOOR

CROSS REFERENCE TO RELATED APPLICATIONS

The present application is a U.S. National Phase of International Application No. PCT/EP2023/065190 entitled "DOOR DRIVE DEVICE FOR ELECTROMOTIVELY DISPLACING A VEHICLE DOOR," and filed on Jun. 7, 2023. International Application No. PCT/EP2023/065190 claims priority to German Patent Application No. 10 2022 114 432.1 filed on Jun. 8, 2022. The entire contents of each of the above-listed applications are hereby incorporated by reference for all purposes.

BACKGROUND

The proposed solution relates to a door drive device for electromotively adjusting a vehicle door.

Such a door drive device serves for adjusting a vehicle door relative to a vehicle body, in particular for adjusting a vehicle side door.

Such a door drive device comprises an electric motor, a transmission, and an output element. The transmission includes a first gear stage to be driven by the electric motor and a second gear stage operatively connected to the first gear stage. The output element is operatively connected to the second gear stage so that by driving the output element an adjusting force can be output for adjusting the vehicle door. The first gear stage comprises a first housing part. The second gear stage comprises a planetary transmission to be driven by the first gear stage and a second housing part forming a ring gear toothing of the planetary transmission.

A door drive device described in DE 10 2015 215 627 A1 includes an adjustment part in the form of a catch strap, which can be articulated to a vehicle body and can be adjusted via a drive device on the side of the vehicle door so as to move the vehicle door relative to the vehicle body. The drive device includes a cable drum which can be rotated and is connected to the adjustment part in the form of the catch strap via a transmission element in the form of a traction cable in such a way that by rotating the cable drum the adjustment part can be moved to the cable drum and the vehicle door can thereby be adjusted.

From DE 10 2017 130 151 A1 there is known a door drive device comprising a switching means, which serves for producing an operative connection between two components and comprises at least one switching element which can be adjusted in order to switch the switching means between different switching states. The drive device includes a planetary transmission driven via a worm gear.

SUMMARY

It is the object underlying the proposed solution to provide a door drive device which provides for a simple construction in particular for coupling the first gear stage and the second gear stage.

This object is achieved by a door drive device with features as described herein.

Accordingly, the transmission includes an intermediate element which is arranged between the first housing part and the second housing part and connects the first housing part and the second housing part with each other in a torque-resistant manner.

The door drive device uses a two-stage transmission. A first gear stage is arranged at the input end on the side of an electric motor and in operation is driven via the electric motor. A second gear stage, which is configured as a planetary transmission, is operatively connected to the first gear stage and is associated to an output element via which an adjusting force can be output and be introduced into a flux of force for adjusting the vehicle door.

The first gear stage and the second gear stage each include a housing part, wherein a first housing part of the first gear stage is to be connected to a second housing part of the second gear stage in a torque-resistant manner. The second housing part of the second gear stage forms a ring gear toothing for the planetary transmission, which in operation in proper use of the door drive device is to be fixed in a torque-resistant manner and thus stationarily and in a positionally fixed manner relative to the first housing part of the first gear stage.

At the interface between the first housing part and the second housing part different requirements are to be fulfilled. The housing parts are to be connected with each other in a torque-resistant manner so that in operation the housing parts cannot be displaced relative to each other, and the ring gear toothing of the planetary transmission of the second gear stage thus is fixed in operation. The housing parts also are to be centered relative to each other such that components of the first gear stage and of the second gear stage, which are mounted in the housing parts, are properly arranged relative to each other in order to ensure a low-friction and low-noise operation. A transition between the housing parts should also be sealed so that in operation, in particular when the door drive device is arranged in the interior of a vehicle door, moisture cannot get into the region of transmission elements of the gear stages in the interior of the housing parts.

To facilitate the fulfillment of such requirements, an intermediate element is arranged in the door drive device between the first housing part of the first gear stage and the second housing part of the second gear stage, which connects the first housing part and the second housing part with each other in a torque-resistant manner. The intermediate element produces the connection between the housing parts and is connected on the one hand to the first housing part of the first gear stage and on the other hand to the second housing part of the second gear stage. Via the intermediate element, on the one hand a firm hold of the housing parts at each other can be produced. On the other hand, the housing parts can be properly positioned relative to each other via the intermediate element and can thus be centered. The intermediate element also provides for setting a transition between the housing parts such that it fulfills desired requirements, in particular in terms of tightness.

The housing parts can be made of a metal material or of a plastic material. The intermediate element likewise can be made of a metal material or of a plastic material. The material of the housing parts and/or of the intermediate element here can be adapted to the ambient conditions to be expected and in particular can be media-resistant, wherein the manufacture of the intermediate element does not require any expensive post-processing.

In one embodiment, the first gear stage includes a drive gear rotatable relative to the first housing part and an axle element connected to the drive gear. In operation, the drive gear is driven via the electric motor and is operatively connected to the second gear stage via the axle element. Via the axle element, a driving force thus is introduced into the second gear stage and transmitted to the output element via the second gear stage.

In one embodiment, the intermediate element rotatably supports the axle element. The intermediate element thus also provides a support for components of the first gear stage, in particular for the axle element of the first gear stage, on which the drive gear is arranged. The intermediate element directly can provide a bearing, for example a plain bearing, for the axle element, in that the intermediate element forms a cylindrical bearing opening in which the axle element rests. In another embodiment, the intermediate element can form a bearing seat in which a (separate) bearing, for example a ball bearing, is accommodated so that the intermediate element carries a bearing of the transmission and thereby provides a support for the axle element.

Due to the fact that the intermediate element also serves for supporting the axle element it is ensured that the support of the axle element for operative connection with the second gear stage is adjusted to the centering of the housing parts with each other. The intermediate element is arranged between the housing parts and connects the housing parts with each other in a torque-resistant manner. Via the intermediate element, the housing parts thus can be properly centered relative to each other, wherein via the support of the axle element it is additionally ensured that the axle element with the drive gear arranged thereon is supported within the first housing part along a predetermined axis of rotation and hence also is aligned with the second housing part.

A bearing seat for accommodating a bearing, for example a ball bearing, can be formed for example by a plurality of rib portions on the intermediate element, which are lined up at each other along a circumferential direction. In alternation along the circumferential direction to the rib portions radially set-back portions are formed. Such set-back portions for example can form an engagement contour into which a fixing element can engage for axially fixing the bearing to the intermediate element.

In one embodiment, at least some of the rib portions include stop elements for axially limiting the bearing seat. In the mounted position, the bearing, for example formed by a ball bearing, axially rests against the stop elements and is radially supported via the rib portions. On an axial side facing away from the stop elements, the bearing here can be fixed for example by a fixing element which is attached to the intermediate element and therefor positively engages into the set-back portions of the bearing seat for example with latching portions.

The first gear stage for example can form a reduction stage by means of which a rotary movement of the electric motor is geared down into a slower rotary movement of the drive gear.

The first gear stage for example can be designed as a worm gear, in which a drive worm to be driven by the electric motor meshes with the drive gear. The drive worm forming a worm toothing is arranged on a motor shaft of the electric motor and in operation is rotated by the electric motor. The rotary movement of the drive worm here is converted into a rotary movement of the drive gear and thus of the axle element carrying the drive gear, which is operatively connected to the second gear stage and thus drives the second gear stage.

In one embodiment, the drive worm can be rotated about a first longitudinal axis relative to the first housing part. The electric motor here can be connected to the first housing part so that the electric motor is stationarily arranged relative to the first housing part. A motor shaft extends along the first longitudinal axis so that the drive worm can be rotated about the first longitudinal axis by rotating the motor shaft. The drive gear on the other hand can be rotated relative to the first housing part about a second longitudinal axis directed perpendicularly to the first longitudinal axis. The first longitudinal axis, about which the drive worm can be rotated, and the second longitudinal axis, about which the drive gear and also the axle element carrying the drive gear can be rotated, thus are aligned with each other at a right angle. With a speed reduction via the first gear stage and with an installation-space-efficient arrangement of the motor relative to the transmission a favorable force introduction is obtained.

The second longitudinal axis, about which the drive gear can be rotated, can correspond to an axis of rotation of the output element and to a central axis of the planetary transmission of the second gear stage, about which in particular the planetary gear carriers of the second gear stage can be rotated.

In one embodiment, the axle element includes a toothing which meshes with planetary gears of the second gear stage. The axle element serves for driving the second gear stage and therefor is in meshing engagement with planetary gears of the second gear stage via a toothing for example at an end of the axle element. The axle element thus implements an input-side sun gear for the second gear stage in such a way that by rotating the axle element the planetary gears are rotated and in this way a driving force can be introduced into the output element.

The planetary gears of the second gear stage here mesh with the ring gear toothing of the second housing part, which is connected to the first housing part in a torque-resistant manner and thus is held stationarily. Driven by the axle element, the planetary gears of the second gear stage rotate and mesh with the stationary ring gear toothing of the second housing part so that the planetary gears circulate around the associated axis of rotation in the second housing part, and thus a torque is transmitted to a planetary gear carrier on which the planetary gears are rotatably mounted.

In one embodiment, the planetary transmission of the second gear stage is formed by a two-stage planetary transmission. For this purpose, the second gear stage includes an arrangement of first planetary gears rotatably arranged on a first planetary gear carrier and meshing with the ring gear toothing and an arrangement of second planetary gears rotatably arranged on a second planetary gear carrier and meshing with the ring gear toothing. The first planetary gears on the first planetary gear carrier preferably are operatively connected to the axle element of the first gear stage and thus in operation are driven via the axle element. An output on the other hand is effected via the second planetary gear carrier, which therefor preferably is connected to the output element in such a way that the output element is rotated on rotation of the second planetary gear carrier relative to the second housing part.

There is obtained an arrangement in which a first planetary gear carrier rotatably supports first planetary gears and a second planetary gear carrier rotatably supports second planetary gears. In operation, the first planetary gears are driven via the first gear stage. Via the second planetary gear carrier, the output element is driven and thus an adjusting force is output.

The planetary transmission of the second gear stage can effect a further reduction of the speed so that the speed of the electric motor is reduced towards the output element, but a torque is geared up and thus increased.

In one embodiment, the intermediate element includes a first engagement portion which engages into an opening of the first housing part. Additionally or alternatively, the intermediate element can include a second engagement portion which engages into an opening of the second housing part. The first engagement portion and/or the second engagement portion are formed for example by a cylindrical collar portion which engages into an associated cylindrical opening of the first housing part and of the second housing part, respectively. Via such engagement portions the connection of the intermediate element on the one hand with the first housing part and on the other hand with the second housing part is effected. Via the engagement portions a centering and also a torque-resistant fixation of the housing parts relative to each other can be effected in that on engagement of the engagement portions into the respectively associated opening of the associated housing part the housing parts are properly centered relative to each other and connected to each other.

The first engagement portion axially engages into the associated opening of the first housing part. The second engagement portion on the other hand axially engages into the associated opening of the second housing part. Due to the fact that the respective engagement portion is adapted to the associated opening it is ensured that the housing parts are mounted in a positionally correct way relative to each other via the intermediate element.

In one embodiment, the intermediate element is sealed in a moisture-tight way on the first engagement portion relative to the first housing part and/or on the second engagement portion relative to the second housing part. Via the engagement portions, a transition between the intermediate element and the respectively associated housing part thus can also be produced, which is sealed in a moisture-tight way. Due to the fact that the intermediate element is sealed on the one hand relative to the first housing part and on the other hand relative to the second housing part, a transition between the housing parts is closed in a moisture-tight way so that moisture cannot get from outside into the region of the transmission parts within the housing parts.

The function of centering and the function of sealing at the engagement portions here can be spatially separated from each other.

In one embodiment, the first engagement portion includes a first centering portion for centering abutment against the first housing part and a first sealing portion axially and/or radially spaced apart from the first centering portion for sealing relative to the first housing part. Additionally or alternatively, the second engagement portion can include a second centering portion for centering abutment against the second housing part and a second sealing portion axially and/or radially spaced apart from the second centering portion for sealing relative to the second housing part. The centering of the respective housing part relative to the intermediate element and the sealing thus is effected at different portions which are spatially separated from each other. This provides for optimizing the centering effect and the sealing effect independently of each other. For centering, the centering portion of the respective engagement portion can be adapted to an associated portion of the first housing part such that the respective housing part in a centered and positionally correct way is fixed to the intermediate element with little clearance. Via the sealing portion on the other hand sealing is effected, for example in that at the sealing portion a sealing element for example in the form of a circumferential O-ring is arranged. Because for a sufficient sealing effect the sealing element should be elastically deformable, a greater clearance can be provided between the sealing portion and an associated housing portion of the respective housing part so that the sealing element is elastically deformed in sealing abutment and thus can seal a transition in a moisture-tight way.

The centering portion and the sealing portion of the respective engagement portion can be separated from each other for example via a step and thus be spaced apart from each other both axially and radially.

In one embodiment, the intermediate element includes a flange portion circumferentially extended on the intermediate element, which radially protrudes relative to the first engagement portion and/or to the second engagement portion. The flange portion for example can define a separating plane in that the first housing part is arranged on a first side of the flange portion and the second housing part is arranged on a second side of the flange portion facing away from the first side.

In one embodiment, the intermediate element includes at least one first form-fitting portion for fixing the intermediate element to the first housing part in a torque-resistant manner. The first form-fitting portion can be arranged for example on the first engagement portion or also on the flange portion and in the mounted position engages into an associated counter-contour at the first housing part so that due to a form fit a torque-resistant connection thereby is created between the first housing part and the intermediate element.

In one embodiment, the intermediate element includes at least one second form-fitting portion for fixing the intermediate element to the second housing part in a torque-resistant manner. The second form-fitting portion can be arranged for example on the second engagement portion or on the flange portion and in the mounted position engages into an associated counter-contour at the second housing part so that due to a form fit a torque-resistant connection thereby is created between the second housing part and the intermediate element.

The second form-fitting portion can be formed for example by a toothing portion which is in engagement with the ring gear toothing. The ring gear toothing in a synergetic dual use thus is also used for the torque-resistant fixation of the second housing part to the intermediate element, in that on assembly an engagement between the toothing portion at the intermediate element and the ring gear toothing is produced.

The door drive device serves for driving a vehicle door, in particular a vehicle side door. The door drive device here can be connected for example to a door hinge via the output element and act on a joint axis of the door hinge so as to adjust the vehicle door. A kinematic transmission for transmitting an adjusting force to the vehicle door also is conceivable and possible, for example a lever transmission in the form of a four-bar linkage or the like.

BRIEF DESCRIPTION OF THE DRAWINGS

The idea underlying the solution will be explained in detail below with reference to the exemplary embodiments illustrated in the Figures.

FIG. 1 shows a schematic view of a vehicle door at a vehicle with a door drive device arranged thereon.

Figure 4:
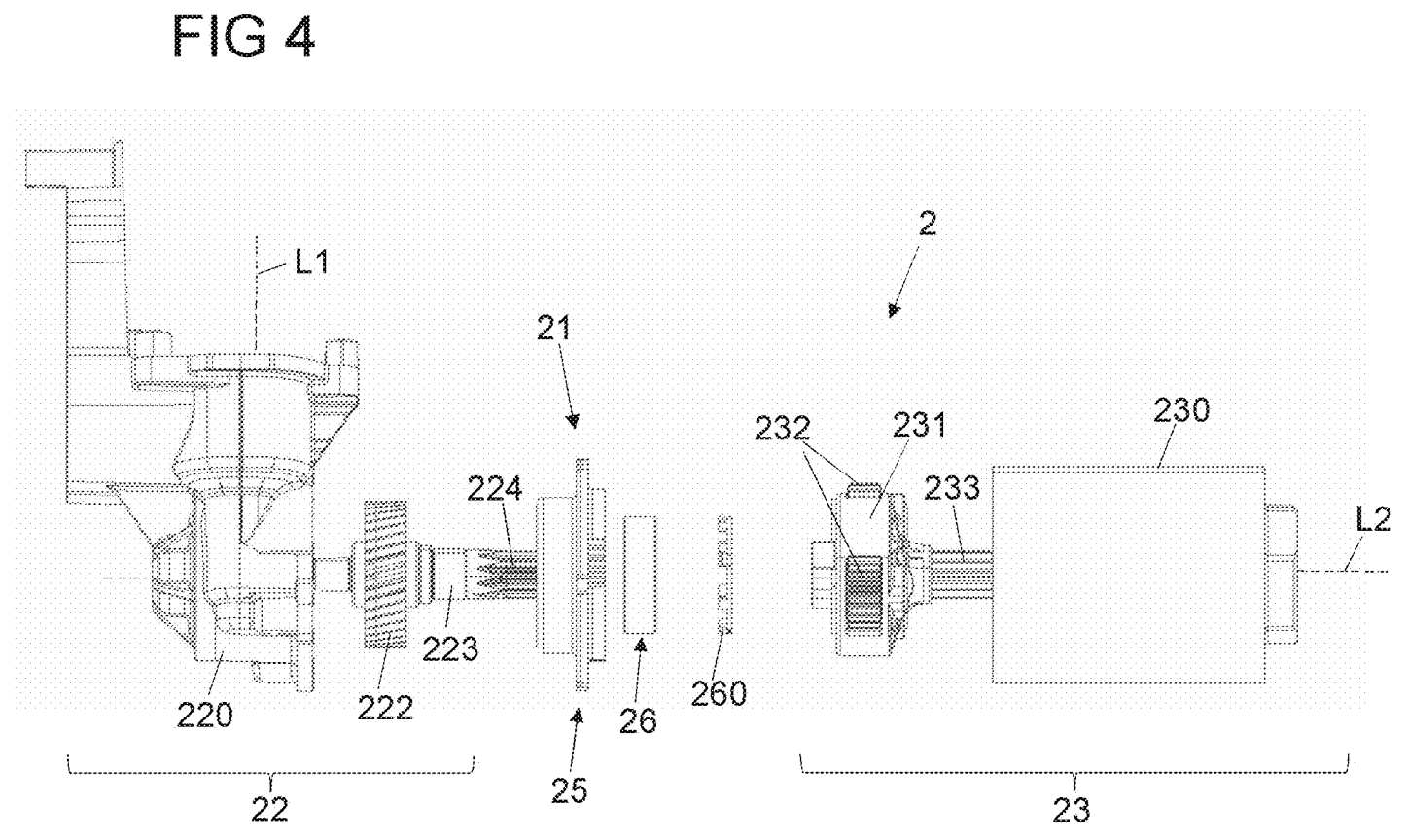

FIG. 4 shows another view of the transmission.

FIG. 9 shows a separate view of the intermediate element.

FIG. 10 shows a sectional view through the intermediate element.

FIG. 11 shows the sectional view of FIG. 10, together with a bearing accommodated on the intermediate element.

FIG. 14 shows a schematic view of two housing parts with an intermediate element of a transmission arranged in between.

DETAILED DESCRIPTION

Figure 1:
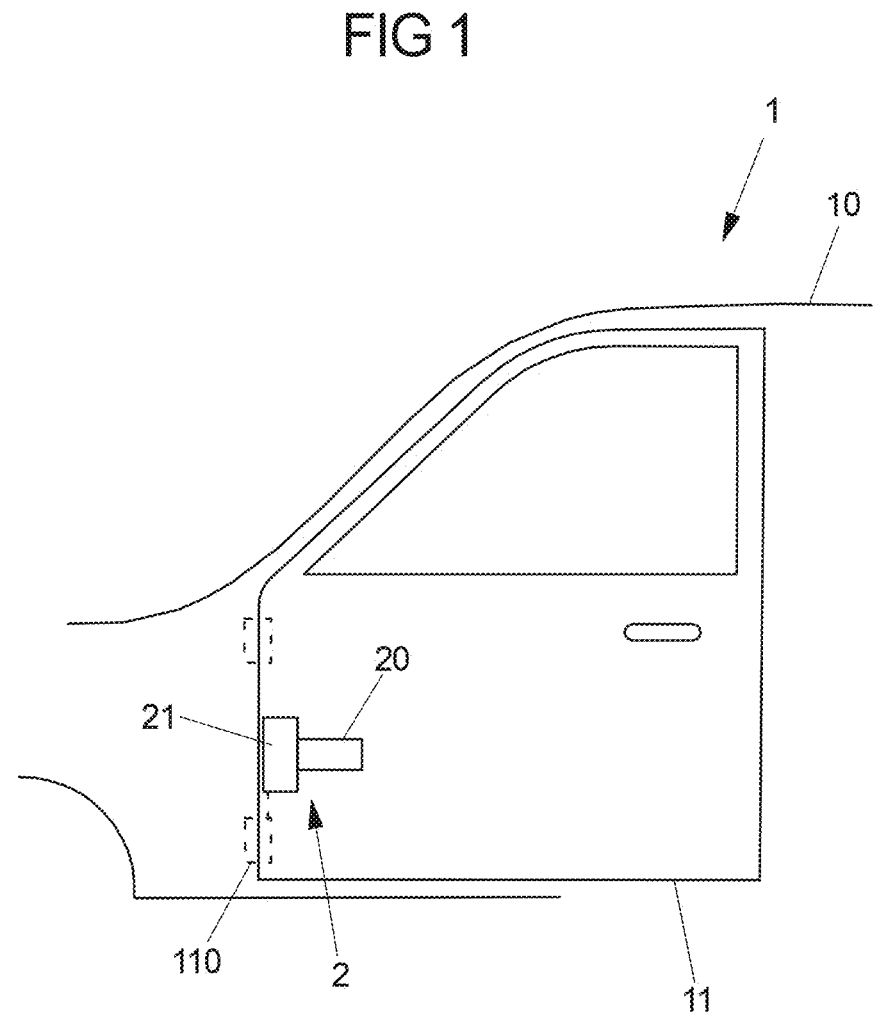
Figure 2:
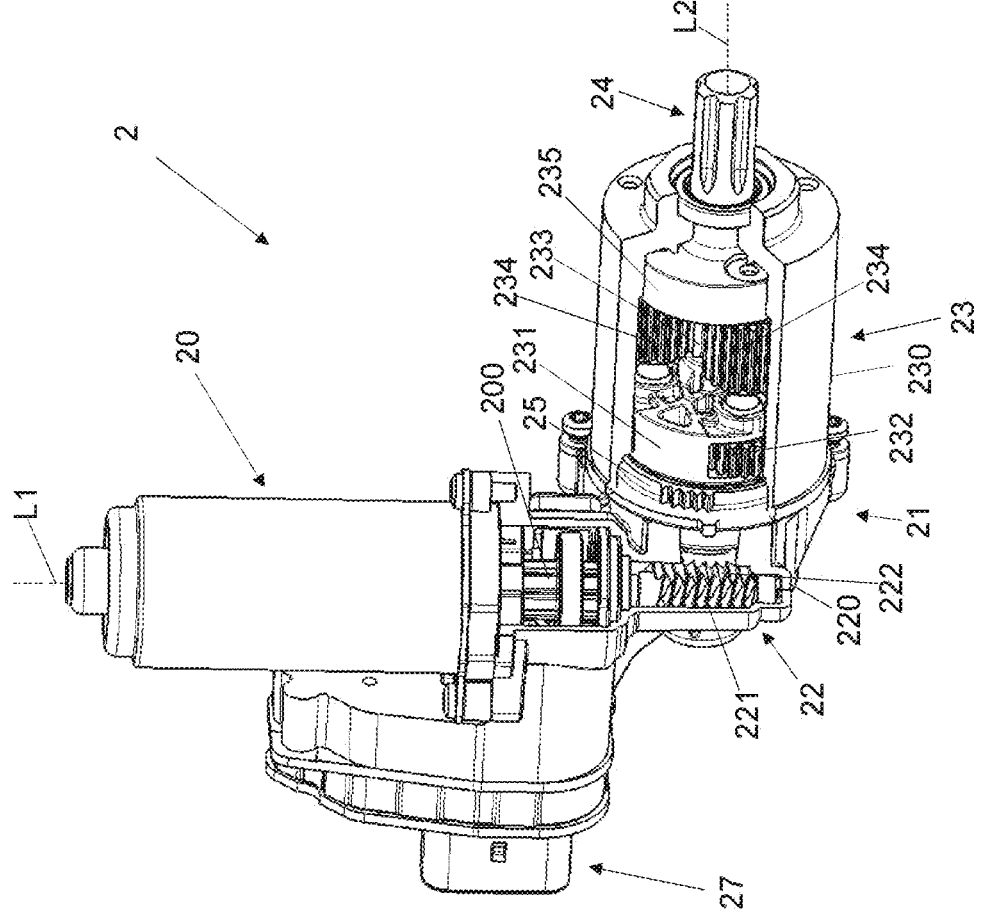
FIG. 2 shows a view of an exemplary embodiment of a door drive device.
Figure 3:
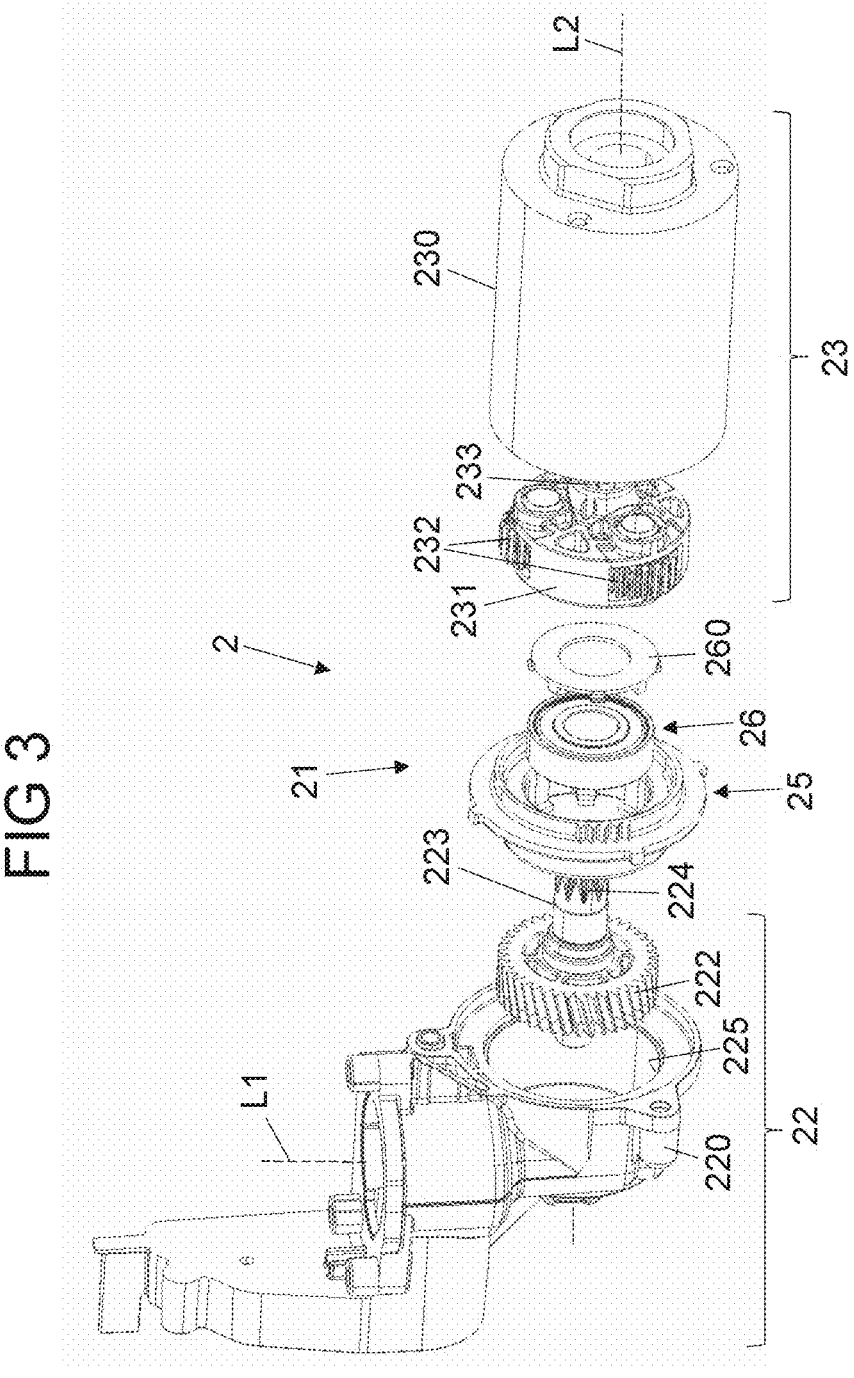
FIG. 3 shows a view of a transmission of a door drive device.

FIG. 1 shows a schematic view of a vehicle 1 which includes a vehicle door 11 in the form of a vehicle side door pivotable relative to a vehicle body 10. The vehicle door 11 is coupled to the vehicle body 10 via door hinges 110 and can be pivoted about the door hinges 110 relative to the vehicle body 10.

A door drive device 2 serves for electromotively adjusting the vehicle door 11 relative to the vehicle body 10 and therefor includes an electric motor 20 and a transmission 21 for introducing an adjusting force into the vehicle door 11. The door drive device 2 for example can act on one of the door hinges 110 and introduce a torque into a joint axis of the door hinge 110 so as to adjust the vehicle door 11 between a closed position and an open position in an electromotively driven way.

In an exemplary embodiment of a door drive device 2 shown in FIG. 2 an electric motor 20 is coupled to a transmission 21 which includes two gear stages 22, 23. Via the transmission 21 an output element 24 is driven, which for example is operatively connected to a joint axis of a door hinge 110 of a vehicle door 11 or drives a kinematic transmission, for example a four-bar linkage or the like, so as to move the vehicle door 11 relative to the vehicle body 10.

The door drive device 2 for example can be stationarily arranged on the vehicle door 11 and in this case is adjusted jointly with the vehicle door 11. The door drive device 2 therefor can be arranged for example in a door interior space of the vehicle door 11, for example in a wet space of the vehicle door 11.

In the illustrated exemplary embodiment, the first gear stage 22 of the transmission 21 includes a housing part 220 to which the electric motor 20 and a control device 27 is firmly connected. In the housing part 220, as can be taken from the different views of the transmission 21 as shown in FIGS. 3 to 8, a drive gear 222 arranged on an axle element 223 is accommodated, which meshes with a drive worm 221 arranged on a motor shaft 200 of the electric motor 20 in such a way that the drive gear 222 driven by the drive worm 221 can be put into a rotary movement within the housing part 220.

The motor shaft 200 with the drive worm 221 arranged thereon can be rotated about a first longitudinal axis L1 relative to the housing part 220. The drive gear 222 is non-rotatably connected to the axle element 223 and can be rotated relative to the housing part 220 about a second longitudinal axis L2 perpendicular to the first longitudinal axis L1. The axes of rotation L1, L2 of the drive worm 221 on the one hand and of the drive gear 222 on the other hand thus are perpendicular to each other.

Figure 5:
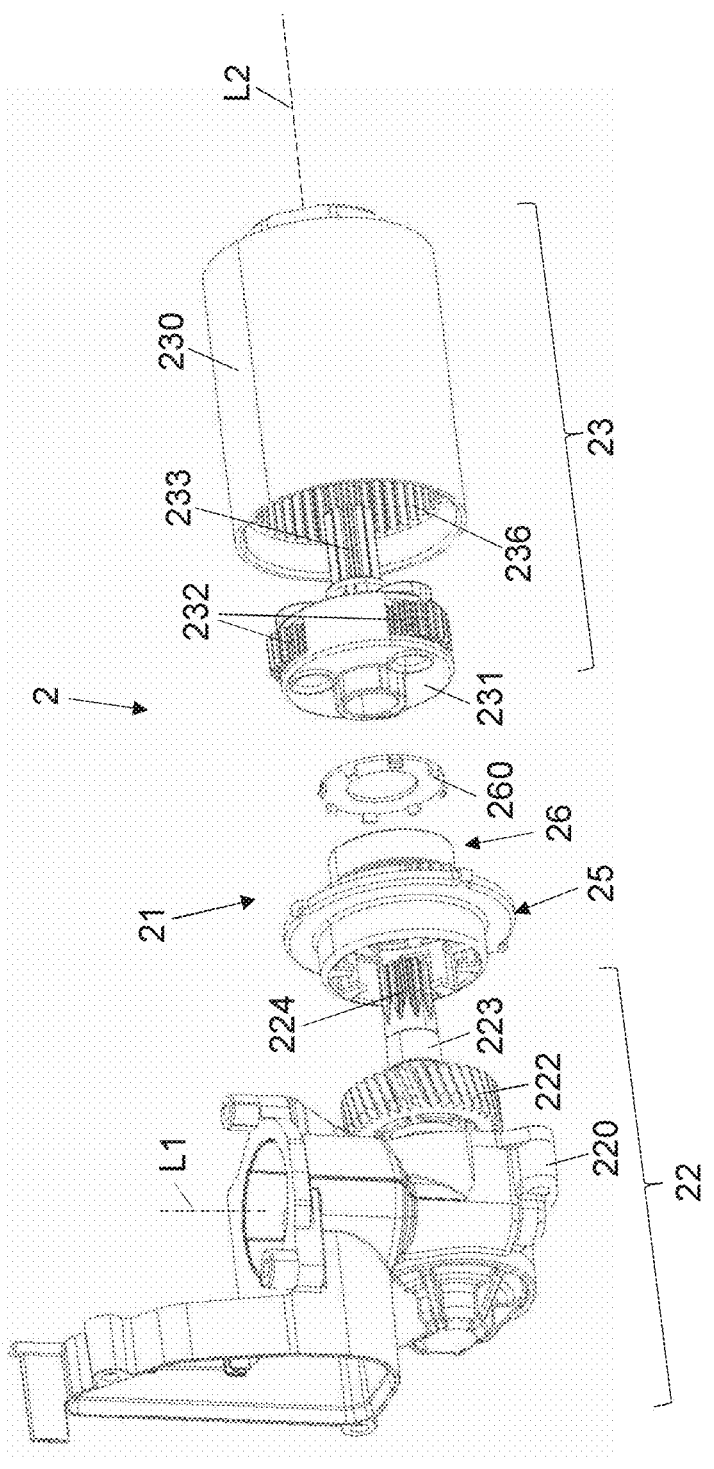
FIG. 5 in turn shows another view of the transmission.
Figure 6:
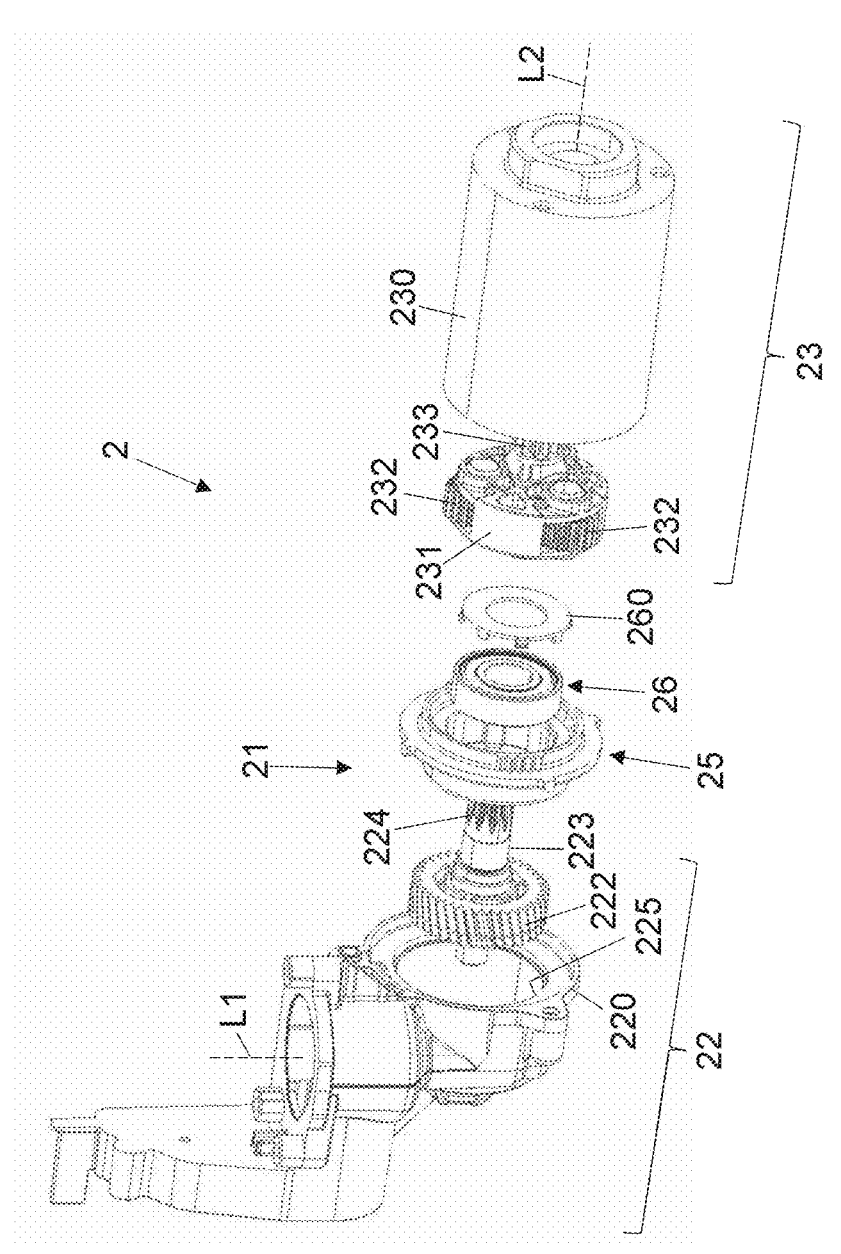
FIG. 6 in turn shows another view of the transmission.
Figure 7:
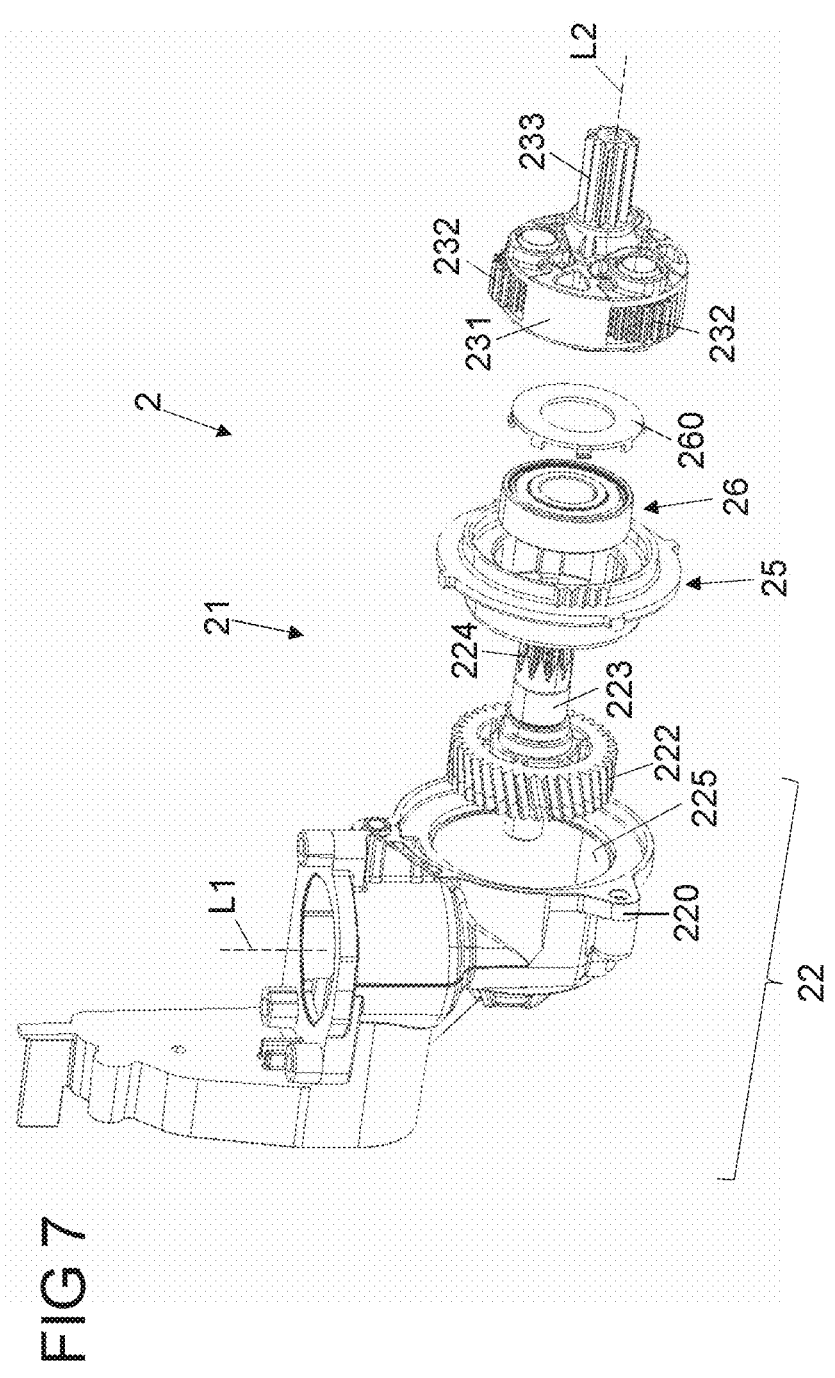
FIG. 7 shows a view of the transmission, without a ring gear formed by a housing part of a second gear stage.
Figure 8:
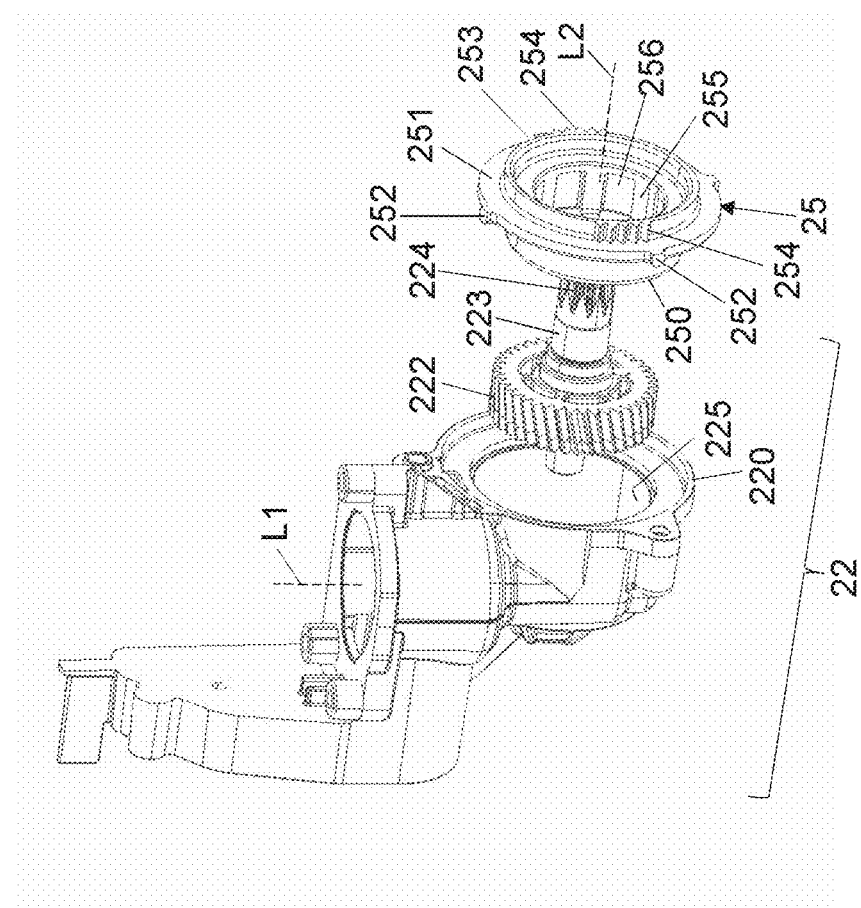
FIG. 8 shows a view of a first gear stage of the transmission together with an intermediate element.

The second gear stage 23 is formed by a planetary transmission and includes a housing part 230 which has a cylindrical basic shape and forms a ring gear toothing 236 in an inner cavity, as this can be taken for example from FIG. 5. The planetary transmission includes two planetary gear stages with two groups of planetary gears 232, 234, which each are rotatably mounted on an associated planetary gear carrier 231, 235 and mesh with the ring gear toothing 236.

First planetary gears 232 on a first planetary gear carrier 231 here are in meshing engagement with a toothing 224 at an end of the axle element 223, so that the axle element 223 drives the planetary gears 232 and in operation puts the same into a rotary movement which leads to the fact that the planetary gears 232 circulate around the ring gear toothing 236 and thereby rotate the planetary gear carrier 231 within the housing part 230.

The planetary gear carrier 231 of the first planetary gear stage is non-rotatably connected to an axle element 233, which includes a toothing that is in meshing engagement with the planetary gears 234 on the planetary gear carrier 235 of the second planetary gear stage. When the first planetary gear carrier 231, driven via the first gear stage 22, thus is put into a rotary movement, the same is transmitted to the planetary gears 234 of the second planetary gear stage via the axle element 233 so that the planetary gears 234 circulate around the ring gear toothing 236 and thereby rotate the planetary gear carrier 235 within the housing part 230.

The planetary gear carrier 235 is firmly connected to the output element 24 so that a rotary movement of the planetary gear carrier 235 leads to a rotation of the output element 24.

In the transmission 21 the housing parts 220, 23 are fixed to each other in a torque-resistant manner so that in operation the ring gear toothing 236 of the housing part 230 is held in position relative to the housing part 220 and hence stationarily relative to the electric motor. To connect the housing parts 220, 230 to each other an intermediate element 25 is provided, which is arranged between the housing parts 220, 230 and centers the housing parts 220, 230 relative to each other and also fixes the same to each other in a torque-resistant manner.

Separate views of the intermediate element 25 are shown in FIGS. 9 and 10 and, jointly with a bearing 26, in FIG. 11. The intermediate element 25 includes a first engagement portion 250 in the form of a cylindrical collar portion, which axially protrudes from a flange portion 251 along the longitudinal axis L2 and engages into an associated opening 225 (see for example FIG. 3) of the housing part 220. On a side of the flange 251 facing away from the engagement portion 250 the intermediate element 25 also includes a second engagement portion 253 which likewise is formed by a cylindrical collar portion and engages into the inner cavity of the housing part 230. Due to the engagement of the engagement portions 250, 253 into the housing parts 220, 230, the housing parts 220, 230 are arranged relative to each other such that the gear stages 22, 23 are properly aligned relative to each other.

In its interior, the intermediate element 25 forms a bearing seat in which the bearing 26 is accommodated. The bearing seat is formed by rib portions 255 which are lined up at each other along a circumferential direction pointing around the longitudinal axis L2, wherein between the rib portions 255 set-back portions 256 each are formed, which are set back radially with respect to the rib portions 255. The bearing 26 is radially supported via the rib portions 255. At axial ends of the rib portions 255 there are also formed stop elements 257 against which the bearing 26 axially abuts so that the bearing seat is axially limited by the stop elements 257.

On a side facing away from the stop elements 257 the bearing 26 is fixed via a fixing element 260, which for example with latching portions engages into the set-back portions 256 and thus axially fixes the bearing 26 in the bearing seat.

Figure 12:
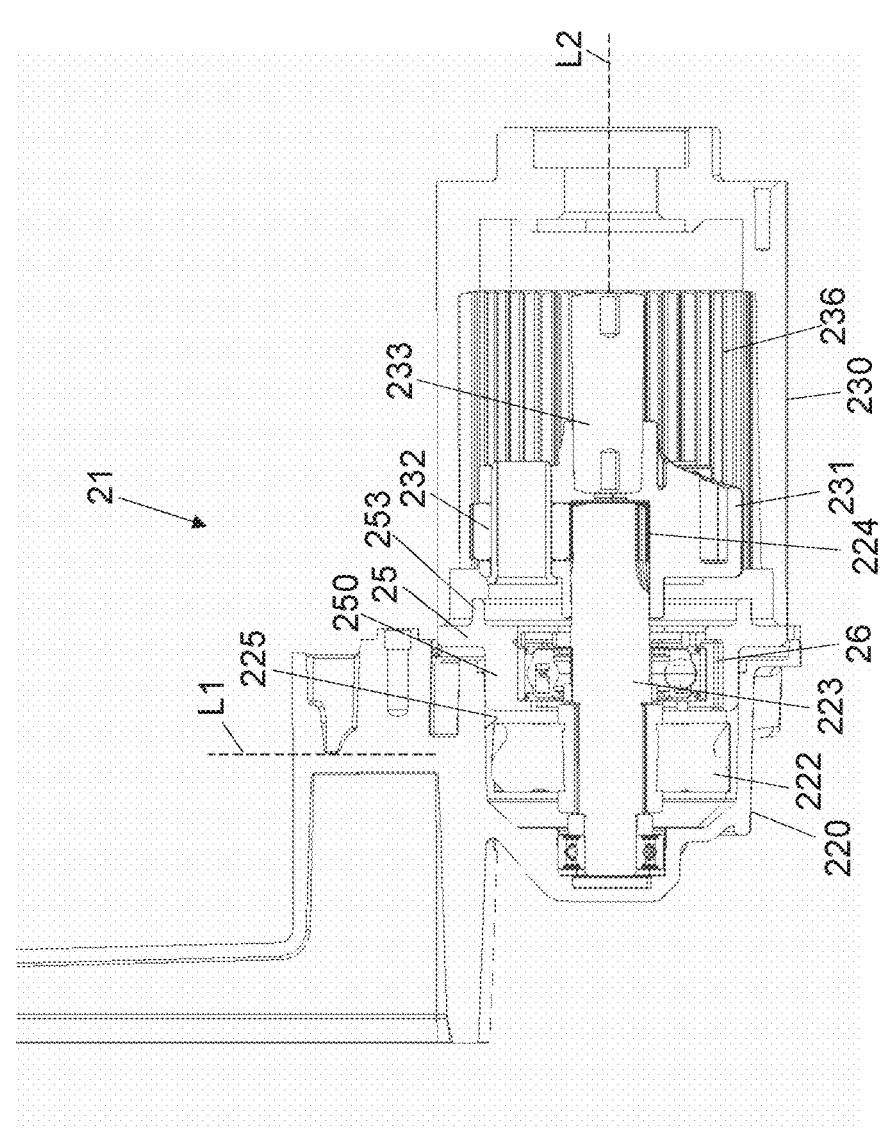
FIG. 12 shows a sectional view of the transmission.
Figure 13:
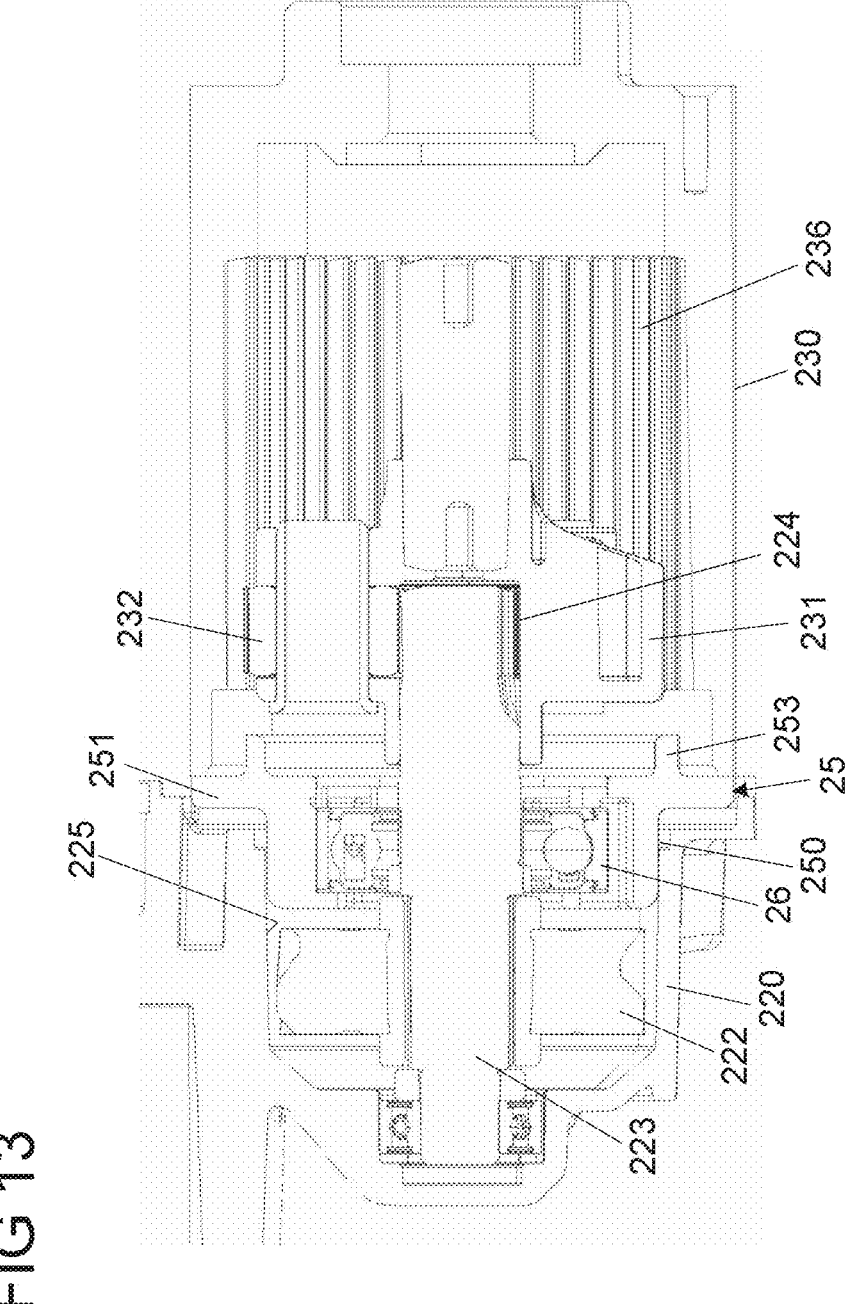
FIG. 13 shows a sectionally enlarged view of the arrangement of FIG. 12.

The bearing 26 serves for supporting the axle element 223 of the first gear stage 22. Because the bearing 26 is arranged on the intermediate element 25 and thus is centered by the intermediate element 25, and because the housing parts 220, 230 also are aligned with each other and thus centered via the intermediate element 25, it is ensured that the axle element 223 and hence the drive gear 222 are radially supported within the housing part 220 in a proper, centered way. Moreover, the ring gear toothing 236 and thus the planetary transmission of the second gear stage 23 are centered relative to the axle element 223, as this can be taken for example from the sectional views of FIGS. 12 and 13, so that a low-friction and low-noise operation is obtained.

In the mounted position, the housing parts 220, 230 are fixed to each other in a torque-resistant manner. In the mounted position, form-fitting portions 252 in the form of radially protruding protrusion elements at the flange portion 251 therefor can engage into an associated counter-contour at the housing part 220 so that a torque-resistant connection between the intermediate element 25 and the housing part 220 thereby is created. Form-fitting portions 254 in the form of toothing portions at the second engagement portion 253 also can engage into the ring gear toothing 236 and thus fix the housing part 230 relative to the intermediate element 25 and hence also relative to the housing part 220 in a torque-resistant manner.

By providing the intermediate element 25 there is obtained a simple connection between the housing parts 220, 230 to be produced at low cost. Via the intermediate element 25, the function of centering and of a torque-resistant connection can be provided. Moreover, the intermediate element 25 also serves for supporting transmission elements, in particular the first gear stage 22.

In addition, via the intermediate element 25 a transition between the housing parts 220, 230 also can be sealed in a moisture-tight way in that a transition between the housing part 220 and the intermediate element 25, for example in the region of the engagement portion 250, and also a transition between the housing part 230 and the intermediate element 25, for example in the region of the engagement portion 253, is sealed in a moisture-tight way, for example by providing sealing elements in the form of O-rings.

In the exemplary embodiment described above, the connection of the intermediate element 25 with the adjacent housing parts 220, 230 is produced via the engagement portions 250, 253 which axially protrude from the flange portion 251 in the form of cylindrical collar portions. Via the engagement portions 250, 253 a centering, a torque-resistant fixation and also a sealing is effected, so that a transition between the housing parts 220, 230 is closed towards the outside in a moisture-tight way.

It here is conceivable and possible to separate the function of centering and the function of sealing at the collar portions 250, 253 from each other so that centering is effected in a way spatially separated from sealing.

Figure 14:
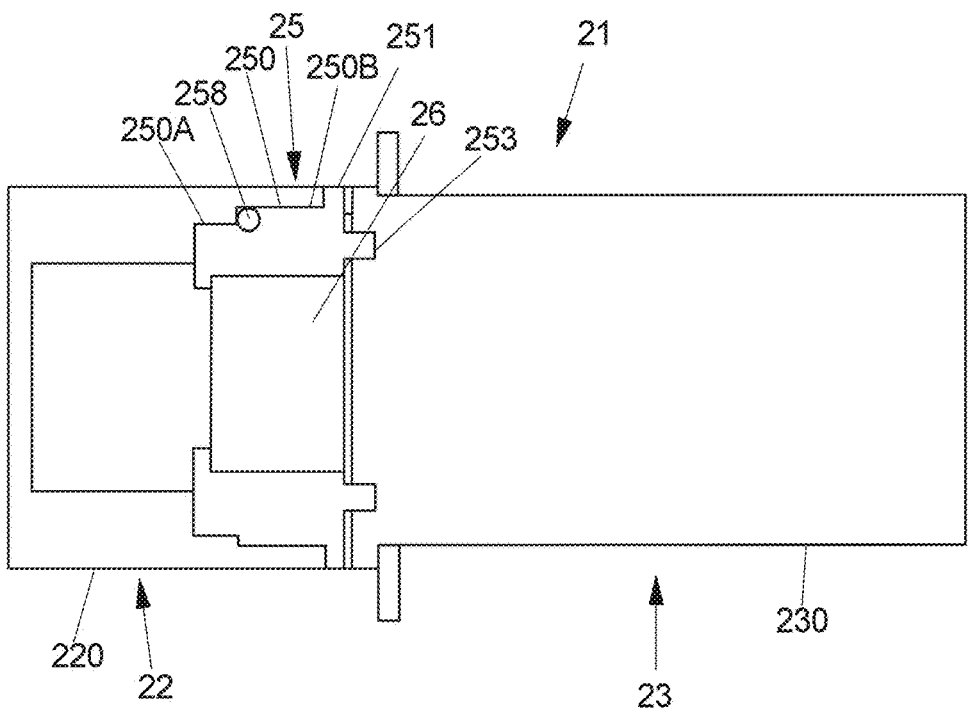
Figure 15:
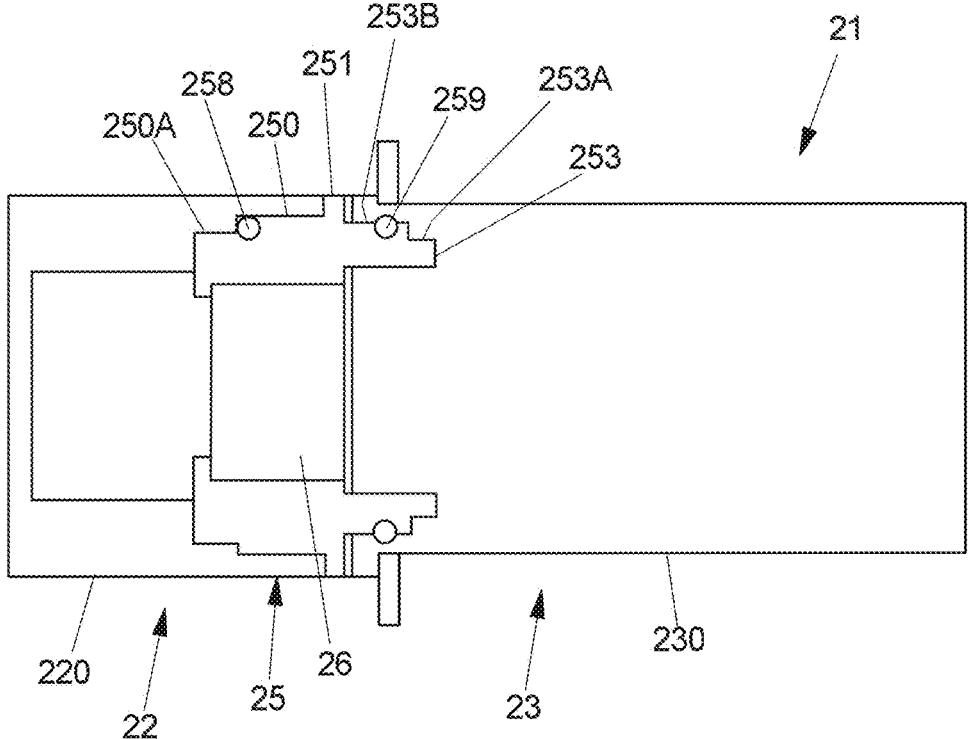
FIG. 15 shows a schematic view of an intermediate element between two housing parts of a transmission, according to another exemplary embodiment.

In an exemplary embodiment shown in FIG. 14, the engagement portion 250 on the side facing the housing part 220 includes a centering portion 250A and a sealing portion 250B axially and radially offset from the centering portion 250A. Via the centering portion 250A, which is accommodated on an associated portion of the housing part 220 with little clearance, centering of the housing part 220 with respect to the intermediate element 25 is effected. Via the sealing portion 250B, sealing with respect to the housing part 220 on the other hand is effected by using a sealing element 258 arranged thereon in the form of an O-ring, for example.

While in the exemplary embodiment of FIG. 14 a centering portion 250A and a separate sealing portion 250B merely are provided on the engagement portion 250, a centering portion 253A and a sealing portion 253B axially and radially offset from the centering portion 253A with a sealing element 259 arranged thereon in the form of an O-ring, for example, also are provided on the other engagement portion 253 associated to the housing part 230.

Due to the fact that a centering portion 250A, 253A is spatially separated from a sealing portion 250B, 253B of the engagement portion 250, 253, a sealing effect is independent of centering. Centering with respect to the respectively associated housing part 220, 230 preferably is effected with little clearance between the portions associated to each other. A sealing effect on the other hand requires an elastic deformation at a sealing element 258, 259 and correspondingly a larger clearance between portions associated to each other. Due to the separation of the centering portion 250A, 253A and the sealing portion 250B, 253B both a centering effect and a sealing effect can thus be optimized.

The idea underlying the invention is not limited to the exemplary embodiments described above.

A door drive device as described above can be used for adjusting a vehicle side door at a vehicle, but also for example for adjusting a tailgate in a vehicle.

The door drive device serves for introducing an adjusting force for adjusting the vehicle door, wherein the door drive device can act directly on a door hinge or also a kinematic transmission can be arranged at the output end of the door drive device, for example in the form of a four-bar linkage or another lever transmission.

| List of Reference Numerals | |
| --- | --- |
| 1 | vehicle |
| 10 | vehicle body |
| 11 | vehicle door |
| 110 | door hinge |
| 2 | door drive device |
| 20 | motor |
| 200 | motor shaft |
| 21 | transmission |
| 22 | gear stage |
| 220 | housing part |
| 221 | drive element (drive worm) |
| 222 | drive gear |
| 223 | axle element |
| 224 | toothing |
| 225 | opening |
| 23 | gear stage |
| 230 | housing part |
| 231 | planetary gear carrier |
| 232 | planetary gears |
| 233 | axle element |
| 234 | planetary gears |
| 235 | planetary gear carrier |
| 236 | ring gear toothing |
| 24 | output element |

-continued

| List of Reference Numerals | |
| --- | --- |
| 25 | intermediate element |
| 250 | engagement portion |
| 250A | centering portion |
| 250B | sealing portion |
| 251 | flange portion |
| 252 | form-fitting portion |
| 253 | engagement portion |
| 253A | centering portion |
| 253B | sealing portion |
| 254 | form-fitting portion |
| 255 | support portions |
| 256 | set-back portion |
| 257 | stop element |
| 258, 259 | sealing element |
| 26 | bearing |
| 260 | fixing element |
| 27 | control device |
| L1, L2 | longitudinal axis |

The invention claimed is:

1. A door drive device for electromotively adjusting a vehicle door, comprising
an electric motor,
a transmission which includes a first gear stage to be driven by the electric motor and a second gear stage operatively connected to the first gear stage, and
an output element operatively connected to the second gear stage for outputting an adjusting force for adjusting the vehicle door,
wherein the first gear stage includes a first housing part,
wherein the second gear stage includes a planetary transmission to be driven by the first gear stage and a second housing part forming a ring gear toothing of the planetary transmission,
wherein the transmission includes an intermediate element which is arranged between the first housing part and the second housing part and connects the first housing part and the second housing part with each other in a torque-resistant manner.

2. The door drive device according to claim 1, wherein the first gear stage includes a drive gear rotatable relative to the first housing part and an axle element connected to the drive gear.

3. The door drive device according to claim 2, wherein the intermediate element rotatably supports the axle element.

4. The door drive device according to claim 2, wherein the transmission includes a bearing which rotatably supports the axle element, wherein the intermediate element forms a bearing seat on which the bearing is arranged.

5. The door drive device according to claim 4, wherein the bearing seat is formed by a plurality of rib portions and radially set-back portions arranged along a circumferential direction in alternation with the rib portions.

6. The door drive device according to claim 5, wherein on at least some of the rib portions stop elements are arranged for axially limiting the bearing seat.

7. The door drive device according to claim 4, wherein the bearing is fixed in the bearing seat by a fixing element arranged on the intermediate element.

8. The door drive device according to claim 2, wherein the first gear stage includes a drive worm to be driven by the electric motor, which meshes with the drive gear.

9. The door drive device according to claim 8, wherein the drive worm can be rotated relative to the first housing part about a first longitudinal axis and the drive gear can be rotated relative to the first housing part about a second longitudinal axis directed perpendicularly to the first longitudinal axis.

10. The door drive device according to claim 2, wherein the axle element includes a toothing which meshes with planetary gears of the second gear stage.

11. The door drive device according to claim 1, wherein the second gear stage includes an arrangement of first planetary gears rotatably arranged on a first planetary gear carrier and meshing with the ring gear toothing and an arrangement of second planetary gears rotatably arranged on a second planetary gear carrier and meshing with the ring gear toothing.

12. The door drive device according to claim 11, wherein the second planetary gear carrier is connected to the output element in such a way that the output element is rotated on rotation of the second planetary gear carrier relative to the second housing part.

13. The door drive device according to claim 1, wherein the intermediate element includes a first engagement portion which engages into an opening of at least one of the first housing part and a second engagement portion which engages into an opening of the second housing part.

14. The door drive device according to claim 13, wherein at least one of the first engagement portion and/or the second engagement portion is formed by a cylindrical collar portion.

15. The door drive device according to claim 13, wherein the intermediate element is sealed in a moisture-tight way at least one of on the first engagement portion relative to the first housing part and on the second engagement portion relative to the second housing part.

16. The door drive device according to claim 15, wherein at least one of the first engagement portion includes a first centering portion for the centering abutment against the first housing part and a first sealing portion at least one of axially and radially spaced apart from the first centering portion for sealing relative to the first housing part and the second engagement portion includes a second centering portion for the centering abutment against the second housing part and a second sealing portion at least one of axially and radially spaced apart from the second centering portion for sealing relative to the second housing part.

17. The door drive device according to claim 13, wherein the intermediate element includes a flange portion circumferentially extended on the intermediate element, which radially protrudes relative to at least one of the first engagement portion and/or the second engagement portion.

18. The door drive device according to claim 17, wherein the first housing part is arranged on a first side of the flange portion and the second housing part is arranged on a second side of the flange portion facing away from the first side.

19. The door drive device according to claim 1, wherein the intermediate element includes at least one first form-fitting portion for fixing the intermediate element to the first housing part in a torque-resistant manner.

20. The door drive device according to claim 1, wherein the intermediate element includes at least one second form-fitting portion for fixing the intermediate element to the second housing part in a torque-resistant manner.

* * * * *